Feb. 25, 1936.  A. A. THOMAS  2,031,865
SYSTEM AND APPARATUS FOR RECORDING AND REPRODUCING SOUND
Filed March 7, 1931  5 Sheets-Sheet 1

INVENTOR
Adolph A. Thomas

Feb. 25, 1936.  A. A. THOMAS  2,031,865
SYSTEM AND APPARATUS FOR RECORDING AND REPRODUCING SOUND
Filed March 7, 1931  5 Sheets-Sheet 2

INVENTOR
Adolph A. Thomas

Feb. 25, 1936.  A. A. THOMAS  2,031,865
SYSTEM AND APPARATUS FOR RECORDING AND REPRODUCING SOUND
Filed March 7, 1931  5 Sheets-Sheet 4

INVENTOR
Adolph A. Thomas

Patented Feb. 25, 1936

2,031,865

UNITED STATES PATENT OFFICE 2,031,865

SYSTEM AND APPARATUS FOR RECORDING AND REPRODUCING SOUND

Adolph A. Thomas, New York, N. Y., assignor to Radio Corporation of America, a corporation of Delaware Application March 7, 1931, Serial No. 520,956

29 Claims. (Cl. 179—100.11)

My invention is for a radio-phonograph combination cabinet provided with a novel recording and reproducing device and with automatic switch connections that require no attention by the operator to place the apparatus in condition for recording or reproducing. This household cabinet may be used not only as radio receiver and electric phonograph, but also for recording radio reception and making records of voices and music at home through a transmitter. As will appear later, these various operations are controlled automatically by the mere movements of the transmitter and the recording and reproducing device into and out of operative position. This dispenses with the separate hand switches that were necessary in prior home-recording machines.

Attempts have heretofore been made to provide electric phonographs with attachments for making records at home by inserting a cutting stylus in the needle holder of the pickup. In using those prior recording attachments, it is necessary to put a weight on the pickup during the recording operation, and certain switches must be manipulated to place the machine in condition for recording. Then, in reproducing from a record, the operator must remove the weight from the pickup, take out the cutting stylus and substitute a needle, and lastly he must not forget to set the switches so as to change the machine back into a phonograph. Now, these manual operations require more thought and care than may be expected of many persons, especially women and children, who are perhaps the most frequent users of phonographs and radio sets. Also, a loose weight used for recording but not for reproducing is liable to get lost, or it may be dropped on a record and break it.

It is the purpose of the present invention to overcome the foregoing and other objections and disadvantages in prior home-recording phonographs by providing novel recording and reproducing apparatus, together with automatic switch mechanism which changes the machine from recording to reproducing condition and vice versa without the operator's attention. The various manual operations that had to be performed in prior home recording machines are not necessary in the use of my new cabinet.

One feature of my invention comprises a combined recording and reproducing unit which is easily adjustable on its support to perform either operation. This unit carries a recording stylus for cutting a sound groove and a separate stylus or needle for playing a record in the usual way. Either stylus may be brought into operative relation to a record by a simple adjustment of the unit on its supporting arm. For recording on a pre-grooved wax disk, I may provide an electric heating coil for the cutting stylus which thereby softens the wax walls of the spiral groove sufficiently to produce a clear-cut sound track.

I have previously mentioned that in prior home recording machines it was necessary to place a weight on the pickup for recording, because the cutting stylus must be held in the groove with a certain amount of pressure. For reproducing, however, the needle point requires but slight pressure and the weight must therefore be taken off the pickup. Should a person forget to lay the weight on the pickup when recording, the resultant record would be useless or at least unsatisfactory. I overcome this objection by providing my combined recording and reproducing unit with an adjustable weight which automatically moves to a position of increased pressure when the recording stylus engages a record. When the unit is adjusted into reproducing position, the weight is automatically shifted to decrease the pressure on the playing needle.

In radio-phonograph combination cabinets, one amplifying system and loudspeaker are used for both operations, it being only necessary to manipulate a switch in changing from radio to phonograph and vice versa. When a cabinet of this type is provided with an attachment for the recording of radio reception and making one's own records by means of a microphone, many changes in circuit connections are necessary. In prior machines, these circuit changes have to be made by hand and that requires a certain amount of care and attention by the operator. If he is negligent in this respect, as by forgetting to change the switch connections or operating a wrong switch, the intended operation will not take place. These switch manipulations become complicated when the machine is used as a radio receiver alone, as a receiver with simultaneous recording, as a phonograph, and for making home records by using a microphone. Even when a single finger piece operates the switch mechanism that causes the machine to perform any one of the above-mentioned operations, that finger piece must be moved to the correct position. It is a common experience that people do not like household machines like radios and phonographs in which this part and that part must first be set right before the machine can be operated.

In my combination radio-phonograph-recording cabinet, a person is relieved of all responsibility in placing the apparatus in any one of its operative conditions. The switch mechanism that causes the machine to perform the desired function is automatically controlled by the position of the recording and reproducing unit, and also by the position of the microphone which is used for home recording. This automatic switch mechanism comprises switches carried by the recording and reproducing unit, switches operated by a movable support on which the unit normally rests, and switches controlled by the position of the transmitter.

The use of my combination cabinet for any one of its intended purposes is so simple that even a child can perform the required operations. When the phonograph unit and transmitter are in normal position, the radio receiver alone is operative and is tuned in the usual way. To record a radio number, it is only necessary to lift the phonograph unit off its support and place it in recording position on a blank disk. This recording goes on while the loudspeaker reproduces the broadcast, and it can be stopped at any time by simply returning the recording unit to its support. For making a record of a person's voice, the recording stylus is placed on a rotating record blank and the transmitter is removed from its normal or rest position. These movements of the recording unit and transmitter automatically cut out the radio receiver and loudspeaker, leaving the amplifying system in condition for recording. To play a record, it is only necessary to place the phonograph unit in reproducing position, it being assumed that the transmitter is left in normal rest position. The motor that operates the turntable is out of circuit as long as the phonograph unit rests on its support. The mere lifting of the unit off its support automatically closes the motor circuit to start the turntable. Conversely, when the phonograph unit is returned to its support, the motor circuit is automatically broken.

The various novel features and practical advantages of my invention will be fully understood from a description of the accompanying drawings, in which—

Figure 1:
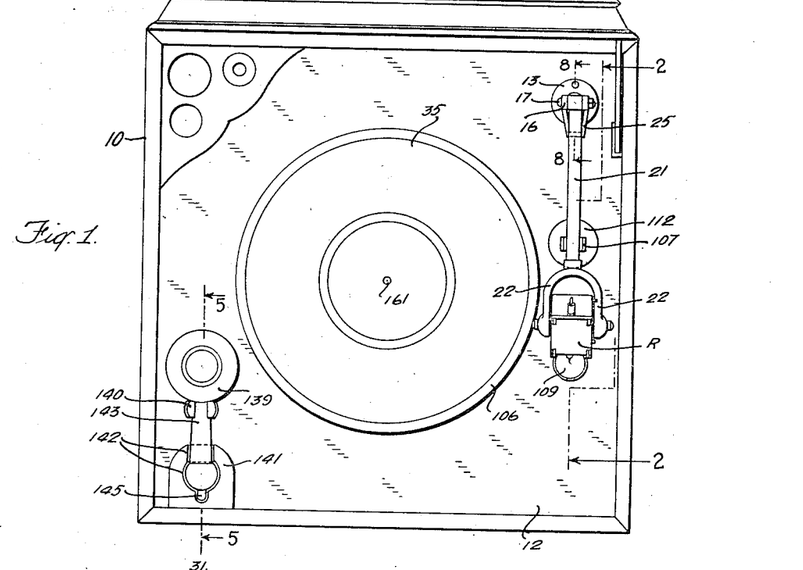
Fig. 1 is a top view of a phonograph cabinet (or a combination radio-phonograph cabinet) containing my new recording and reproducing apparatus.

The cabinet 10 shown in Fig. 1 represents any suitable style or design of household cabinet containing phonographic mechanism either alone or in combination with a radio receiver. In the present instance the cabinet is supposed to contain both kinds of apparatus, but I have not considered it necessary to show the position of the radio receiver in the cabinet, since that is not important. The top board 12 of the cabinet supports a hollow post 13, which may be a casting secured by screws 14 or otherwise. A sleeve 15 rotatably mounted in post 13 terminates at its upper end in a pair of spaced ears or lugs 16 which support a bolt or cross-pin 17. The rotary sleeve 15 has an annular shoulder 18 which rests on top of the post 13, and a split ring 19 seated in a groove 20 of the sleeve holds the latter against axial displacement.

Figures 7, 8, 9, 10:
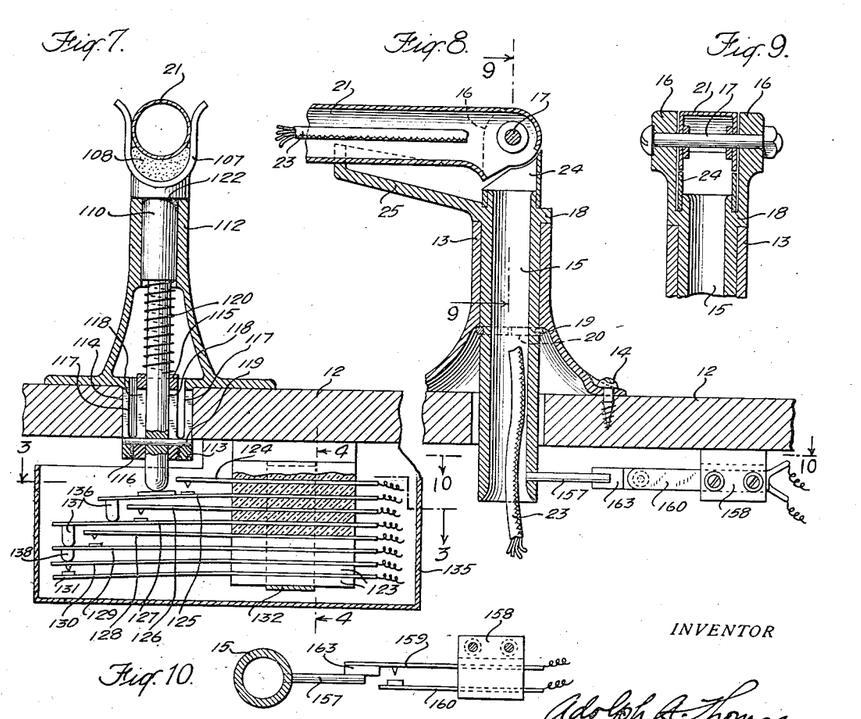
Fig. 7 is an enlarged transverse section on line 7—7 of Fig. 2.
Fig. 8 represents an enlarged fragmentary section on line 8—8 of Fig. 1.
Fig. 9 is a section on line 9—9 of Fig. 8.
Fig. 10 is a sectional plan view on line 10—10 of Fig. 9.

The cross-pin 17 on the rotary sleeve 15 supports an arm 21, which is preferably a light hollow metal tube. The front end of arm 21 carries a yoke or U-shaped member comprising a pair of spaced extensions 22, between which my new recording and reproducing unit R is pivoted. The yoke 22 is rigidly attached to the swinging arm 21 in any practical way, as by a socket 22', which may be clamped in adjusted position on the arm by a set-screw or otherwise. In some instances the yoke 22 may be formed integral with arm 21. By making the yoke extensions 22 hollow or channel-shaped, they serve the additional purpose of concealing the conductors 23 that lead into unit R. These conductors may pass as a single cable through the hollow arm 21 and rotary sleeve 15, as shown in Fig. 8. To conceal the conductors 23 entirely from view at the junction of arm 21 and sleeve 15, the latter may be provided with a cap 24 which does not interfere with the movements of the arm about the pivot pin 17. The sleeve 15 carries a forwardly extending bracket 25 adapted to receive the arm 21 and hold the latter rigidly in horizontal position during the operation of recording-reproducing unit R. In other words, the bracket 25 prevents the arm 21 from dropping below a predetermined position, yet permitting the arm to be lifted about the pivot pin 17.

The structural details of the combined recording-reproducing unit R are disclosed in Figs. 11–19, which will now be described. The outer casing which houses the operative mechanism of this unit comprises a box or cover section 26 and a rigid base plate 27, to which the cover section is removably attached by screws 28 or otherwise. The cover section 26 is preferably formed of sheet metal and the base plate 27 may be a casting of light strong metal like duralumin, which has the additional advantage of being non-magnetic. If desired, however, the casing parts 26 and 27 may be molded of insulating material such as bakelite, which has insulating properties and may be produced in various colors. Through openings in the opposite ends of casing 26 project two holders 29 and 30 adapted to receive respectively a recording stylus 31 and a reproducing stylus 32. Each holder is provided with a thumb-screw 33 or the like for removably securing the stylus in place. The recording stylus 31 is adapted to cut a spiral groove 34 in a disk record 35 of wax or other material capable of being operated upon by the recording stylus. It has been the practice of certain phonograph manufacturers to furnish wax disks with a preformed spiral groove. When the recording stylus 31 is placed in the groove of such a record, the lateral vibrations of the stylus causes it to cut away the side walls of the preformed groove in accordance with the electric impulses that control the movements of the stylus. If wax records are used, the recording stylus 31 may have a cutting point of such hardness and durability that the stylus will last as long as the machine and need never be replaced. The reproducing stylus 32 is an ordinary phonograph needle for playing lateral-cut records.

Figures 11, 12, 13, 14, 15:
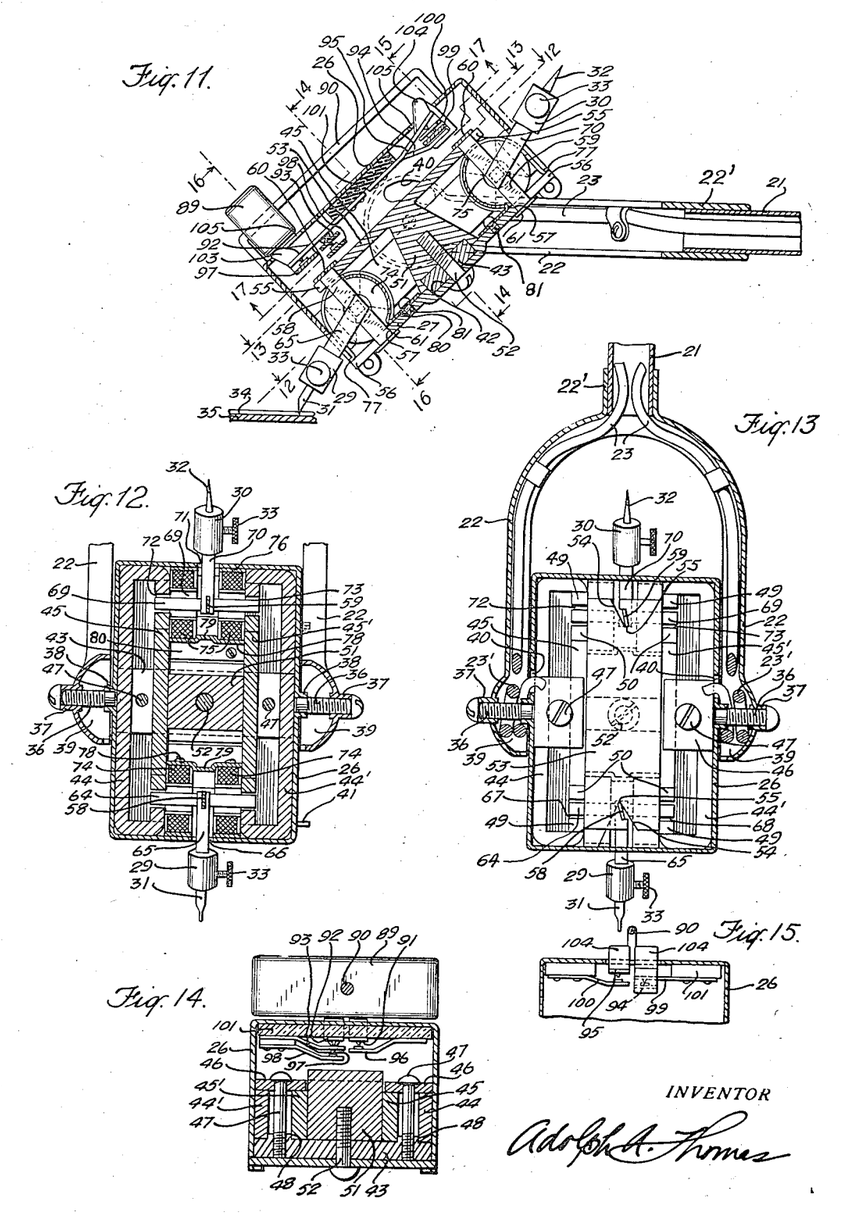
Fig. 11 shows a longitudinal section through the combined recording and reproducing unit, which is shown in recording position.
Figs. 12–17 represent various sectional views of the recording-reproducing unit on section lines 12—12 to 17—17, respectively, of Fig. 11, these views being in the directions indicated by the arrows associated with the section lines.

The recording and reproducing unit R is pivoted on pins 36 between the yoke arms 22, so that either stylus may be brought into operative position. Referring to Figs. 12 and 13, the pins 36 are screwed into bushings 37 at the free ends of yoke arms 22, and the inner ends of the pins enter bearings 38 in the sides of casing 26. The adjustable screw-pins 36 thus provide very simple means for mounting the unit R between the yoke arms 22 and removing it when necessary. The pivot pins 36 pass through recesses 39 in the ends of yoke arms 22, and these recesses may be utilized to receive the coiled portions 23' of conductors 23, which enter the casing 26 through arcuate slots 40. As shown in Fig. 11, the slots 40 are long enough to permit rotation of unit R from one position to the other without interference by the coiled portions 23', which act like flexible hinges for conductors 23. A pair of stops 41 and 41' projecting laterally from casing 26 and base plate 27 (see Figs. 2, 12 and 13) prevent the unit R from being always turned in the same direction and compel adjustment of the unit back and forth. This precludes undue tightening of the conductor coils 23' about the pivot pins 36.

Figures 16, 17, 17A, 18, 19:
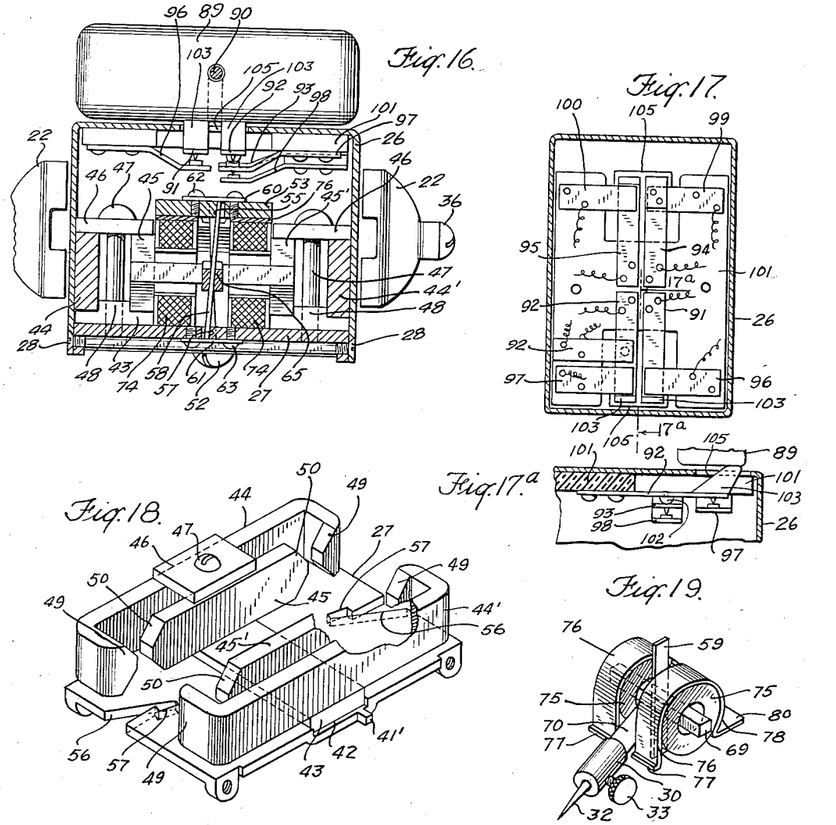
Fig. 17a is a section on line 17a—17a of Fig. 17.
Fig. 18 is a detached perspective view of the field magnet system embodied in the recording and reproducing unit shown in Figs. 11–17.
Fig. 19 is a detached perspective view of the armature and coils associated with the reproducing stylus of the unit.
Figure 21:
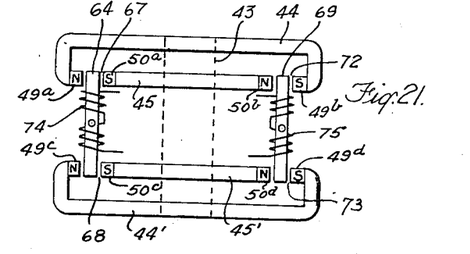
Fig. 21 is a diagram of the field magnet system and its associated pair of pivoted armatures and coils.

Referring to Figs. 11, 14 and 18, the base plate 27 is formed with a transverse recess 42 adapted to receive a cross-bar 43, which may be magnetic or non-magnetic. The cross-bar 43 carries two pairs of permanent magnets 44—44' and 45—45', which are rigidly held in properly spaced relation by non-magnetic plates 46 and bolts 47. To facilitate correct mounting of the field magnets on cross-bar 43, the latter may be formed with a pair of projections 48 arranged to provide shoulders against which the magnets abut, as shown in Figs. 14 and 16. The lugs or projections 48 also provide increased thickness for receiving the screwthreaded ends of securing bolts 47. In the present instance, the inner magnets 45—45' are straight bars, and the outer magnets 44—44' are bent inwardly at their ends to provide pole pieces 49 in alignment with the pole pieces 50 of magnets 45—45'. In Fig. 21 the pole pieces 49 and 50 of the four magnets are differentiated by the suffix letters a, b, c and d to facilitate an explanation of the magnetic circuits, as will presently be described. The four magnets 44—44' and 45—45' are made of steel or an alloy having high magnetic retentivity, so as to assure a substantially constant magnetic field of the required strength. Satisfactory permanent magnets can be made of silicon steel, tungsten-chrome steel, and an aluminum steel alloy called "Mitis iron."

A non-magnetic block 51 (see Figs. 11, 12 and 14) is attached by a screw or bolt 52 to the cross-bar 43, and at the same time the screw 52 secures the cross-bar and the magnets carried thereby to the base plate 27. The non-magnetic block 51 also acts as a spacer for the inner magnets 45—45'. The free end of block 51 carries a plate 53, which may be cast or molded integral with the block. The plate 53 is provided at its ends with slanting cutaway portions 54 which terminate in angularly arranged slots 55, as best shown in Fig. 13. The base plate 27 has cutaway portions 56 which terminate in slots 57 arranged in alignment with the slots 55 of plate 53, but at a slight angle thereto. This will be clear by comparing Figs. 13 and 18. The two pairs of aligned slots 55—57 are adapted to receive two spring blades 58 and 59. As each spring blade is inserted into a pair of slots 55—57, the slight angular displacement of these slots causes the spring blade to be automatically twisted by the mere act of insertion. This twisting of the spring blade at its ends in opposite directions holds the central portion of the blade in permanently tensioned condition and permits lateral vibration of the blade in either direction from its neutral position. The angular slots 55 and 57 are so shaped that they firmly retain the ends of the inserted spring blades 58—59 without additional fastening means. It is only necessary to prevent axial displacement of spring blades 58—59, and that can be done in any practical way, as by small plates 60 and 61 secured over the slots 55 and 57. This is best shown in Figs. 11 and 16. The plates 60 are attached to supporting member 53 by screws 62, and plates 61 are fixed to the outer face of base member 27 by screws 63.

The spring blade 58 carries a magnetic armature bar 64 and a non-magnetic arm 65 to which the holder 29 of recording stylus 31 is attached. The arm 65 extends through a slot 66 in casing 26 to permit free lateral movement of spring blade 58 and all parts carried thereby. The armature 64 projects at its ends into the aligned airgaps 67 and 68 formed by the pole pieces 49 and 50 of the field magnets. The tensioned spring blade 58 normally holds the armature 64 substantially midway in airgaps 67 and 68, and the tendency of the twisted spring is to restore the armature to neutral position. It should be noted (see Figs. 11 and 12) that the spring blade 58 lies in a substantially vertical plane and thereby possesses maximum strength for supporting the weight of the entire unit R during the recording operation. The other flexible spring blade 59 carries an armature bar 69 and an arm 70 to which the needle holder 30 is attached. The arm 70 projects through a slot 71 in the adjacent end of casing 26. The tensioned spring blade 59 normally holds the ends of armature bar 69 substantially midway in the magnetic airgaps 72 and 73 of the field magnet system. Otherwise, what has been said for the function and operation of spring blade 58 applies to spring blade 59. The centralizing and restoring action of the tensioned spring blades 58 and 59 is augmented by the magnetic effect on the polar ends of armatures 54 and 69, which are normally balanced by the field magnet flux. The slots 66 and 71 in the ends of casing 26 permit removal and replacement of the latter without disturbing the armature assemblies.

The recording armature 64 extends through a pair of coils 74, and the reproducing armature 69 extends through a pair of similar coils 75. The coils of each pair are preferably connected in series, and in effect constitute a single coil. A simple and convenient way of securing each pair of coils in position is to clamp them against the base plate 27 by a pair of curved flexible straps 76 which terminate in toes 77 (see Fig. 19) arranged to be engaged by the end edges of casing 26, as shown in Fig. 11. The straps 76 for each pair of coils may be integral fingers of a cylindrical bracket 78 which has a central offset 79 (see Fig. 12) to hold the coils the proper distance apart, and the outer ends of the coils bear against the adjacent sides of the magnetic pole pieces. Each bracket 78 has a flat extension 80 which is secured to the base plate 27 by screws 81 or otherwise, as shown in Fig. 11.

When the recording stylus 31 is in operative position on a rotating record, the current impulses passing through coil 74 polarize the ends of armature 64, so that the latter is oscillated about its center in a direction depending upon the direction of current flow at a given moment. Looking at Fig. 21 and assuming the field magnets to have the polarities indicated by the letters N (north) and S (south), we see that when the armature 64 presents a north pole in airgap 67 and a south pole in airgap 68, the armature ends are attracted toward the pole pieces 50a and 49c. When the polarities of the armature are reversed by the reversal of current flow in coil 74, the armature is attracted by pole pieces 49a and 50c. Whichever pair of oppositely arranged pole pieces attracts the armature, the other pair of pole pieces repels it, whereby the magnetic effect on the armature is amplified. It is clear from Fig. 21 that the adjacent magnets 44 and 45 are arranged in series and provide a long path for the magnetic flux which crosses the two airgaps 67 and 72 without passing lengthwise through the armatures 64 and 69. The same is true of the other pair of field magnets 44'—45', the flux of which passes through the airgaps 68 and 73 in series. This arrangement of the field magnets prevents saturation of the armatures by the normal field flux and increases the sensitiveness of the instrument, both in recording and reproducing. Since each end of the armatures 64 and 69 is subjected to a strong magnetic field flux, and since these fluxes act cumulatively on the armature, the latter is oscillated with the requisite degree of power even by minute current variations in coil 74 during the recording operation.

When the unit R is used for reproducing, the lateral vibrations of armature 69 by the sound groove produce flux changes in coil 75 and thereby generate current impulses in the circuit of the coil. Referring to Fig. 21, if we suppose that the centrally pivoted armature 69 is rocked clockwise toward the pole pieces 49b and 50d, a portion of the field flux passes through coil 75 from the north pole 50d of magnet 45' to the south pole 49b of magnet 44. When the armature 69 is rocked counterclockwise, a portion of the field flux passes through coil 75 in the reverse direction; that is, from the north pole 50b of magnet 45 to the south pole 49d of magnet 44'. These reversals of magnetic flux through coil 75 are more effective in generating electric impulses than if the flux through the coil were merely varied without changing its direction. If the cross-bar 43 is magnetic, it connects the neutral zones of the four magnets and in effect provides four U-shaped magnets arranged in pairs back to back. This will be understood from Fig. 21 without further explanation. If the vibrations of either armature 64 or 69 produce variations of flux at the pole pieces adjacent the other armature, the incidental vibrations of the latter will have no effect on the armature which is in operative position. In the basic aspect of my invention, any practical form of electromagnetic mechanism may be associated with the recording stylus 31 and reproducing stylus 32. It is only necessary that the current impulses generated in coil 74 by transmitted sound waves operate the recording stylus 31 to cut a sound groove in a rotating record blank, and that the mechanical vibrations of needle 32 by the recorded sound groove generate current impulses in coil 75.

One of the chief difficulties in making a satisfactory phonograph record at home is due to the fact that the material of the blank record must be soft enough to be cut by the recording stylus and yet hard enough to retain the shape of the sound groove for mechanically vibrating the reproducing needle. In prior machines for home recording, it has been customary to provide blank disks with preformed spiral grooves for receiving the recording stylus. One type of blank disk is a wax composition, and the other is of metal or metal alloy, but both of these blanks result in records that are far from satisfactory. If the composition of the wax disk is soft enough to yield fully to the cutting action of the recording stylus, it is obvious that the walls of the cut groove are not rigid enough to maintain their cut shape very long when the groove is tracked by the reproducing needle. As for the record blank of metal, while it stands up better than the wax record under the action of the reproducing needle, the fact is that the metal is too hard to cut, and only loud sounds make any impression (a feeble one at the best) on the record surface.

Figure 20:
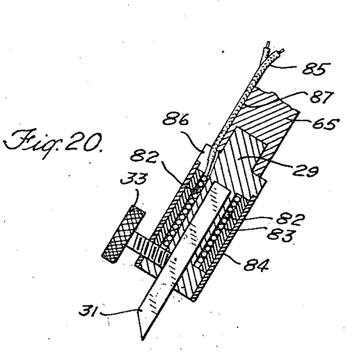
Fig. 20 represents an enlarged axial section through the holder of the recording stylus to show the arrangement of the heating coil therefor.

I overcome the foregoing and other objections and disadvantages inherent in prior record blanks for home recording by heating the metallic cutting stylus 31 sufficiently to soften the wax that comes in contact therewith. For this purpose, the hollow stylus holder 29 (see Fig. 20) is surrounded by a small electric heating coil 82, which is energized only during the recording operation, as I shall explain later on. The heating coil 82, which need only comprise a few turns of nichrome wire or the like, is surrounded by a suitable heat-insulating jacket 83, such as a packing of asbestos fibers. An outer sleeve 84 on holder 29 covers the insulating jacket 83. The thumb-screw 33 that clamps the stylus 31 in the holder, may be of bakelite or other heat-insulating composition. The heating capacity of coil 82 is regulated by trial to heat the point of stylus 31 just enough to soften the wax of the record groove as it comes in contact with the sharp cutting edge of the stylus, which shapes or cuts the softened wax in strict accordance with the transmitted electric impulses in coil 74. The wax hardens instantly after moving out of contact with the stylus during the rotation of the disk. By thus softening the material of the blank record during the recording operation, I make it possible to use a wax composition which at ordinary temperature is very hard, so that it will stand up well under the action of the reproducing needle. The connecting wires 85 of heating coil 82 may pass through a slot 86 in holder 29 and through a groove 87 in arm 65.

During the recording and reproducing operations of unit R, the latter rocks in a vertical plane about the horizontal pivot pins 36 to accommodate itself to any vertical movements of the rotating record surface. During these movements of unit R, the supporting arm 21 rests on the bracket 25 and swings horizontally about the vertical post 13 to allow the operating stylus 31 or 32 to follow the spiral record groove. Since the unit R is supported substantially at the center, the weight of the unit is distributed on opposite sides of the transverse pivot axis 36, as will be clear from Fig. 2, and the effective weight on the recording stylus 31 or reproducing stylus 32 depends upon the distance of the center of gravity of the unit as a whole from the pivot axis. For reproducing, the pressure on the point of needle 32 need only be very slight—not more than a few ounces, or even less than an ounce for some records. For recording, however, the pressure on the cutting point should be sufficient to hold it firmly in the preformed groove of the record blank. In prior home recording machines where the same electric pick-up is used for reproducing and recording by merely replacing the needle with a recording stylus, it has been necessary to place an extra weight on the pickup during the recording operation. This required the design of a pickup flat and wide enough to hold the additional weight, which is objectionable for several reasons, as mentioned in the forepart of this specification.

In my recording and reproducing unit I provide automatic means for increasing the pressure on the recording stylus 31 over that required for the reproducing needle 32, and this automatic pressure increase is accomplished by means of an adjustable weight 89. This weight is slidably mounted on unit R in any practical way, as by means of a rod 90, which is bent at the ends to prevent the weight from sliding off. Since the unit R is always at an angle when in either operative position, the slidable weight 89 automatically adjusts itself by gravity. Thus, when the unit R is in position for reproducing (see Fig. 2), the weight 89 slides down the rod 90 until it strikes the end thereof. It will be observed that the weight 89 is approximately in vertical alignment with the pivot axis 36 of unit R, so that the effect of the weight is practically neutralized. It is, of course, possible to make the rod 90 of such length that the center of gravity of weight 89 during the reproducing operation is to one side or the other of a vertical line passing through the pivot axis 36. Since the weight 89 is below the axis 36, it tends to steady the unit R during the reproducing operation by lowering its center of gravity.

When the unit R is swung into recording position, as shown in Fig. 11, the weight 89 slides by gravity to the front of the casing at the greatest distance from the pivot axis 36, whereby the weight exerts increased pressure on the recording stylus 31. The operator pays no attention to the weight 89, for its movements are entirely automatic and thus assure the proper pressure on the recording stylus 31 and the reproducing stylus 32. If desired, a set-screw may be used to clamp the weight 89 in any adjusted position on rod 90, but in the construction which I am describing I prefer to let the weight slide freely from one end of the rod 90 to the other. The particular shape and mounting of weight 89 are immaterial, and may be varied in different designs of unit R. As a general rule, the weight 89 should give an increased pressure of about six or eight ounces, but this suggestion is not intended in a restrictive sense.

The adjustable weight 89 is also utilized to control certain switches mounted in casing 26. These switches, whose function will be explained in connection with Fig. 22, comprise five movable spring arms numbered 91 to 95 and five fixed contacts numbered 96 to 100 respectively. The switch arms and their associated contacts are mounted on an insulating plate 101 secured to the inner side of casing 26, as best shown in Figs. 16 and 17. The spring arms 91, 92, 93 and 95 are normally held by their inherent tension away from the associated contacts 96, 97, 98 and 100. The spring arm 94 normally presses against its contact 99. The two switch arms 92 and 93 are mechanically connected by an insulating button or pin 102, so that they always move as a unit. The spring arms 91 and 92 are provided at their free ends with insulated cam pieces 103, and the spring arms 94 and 95 have similar cam pieces 104. These two pairs of cam pieces normally project through slots 105 in casing 26.

Figure 2:
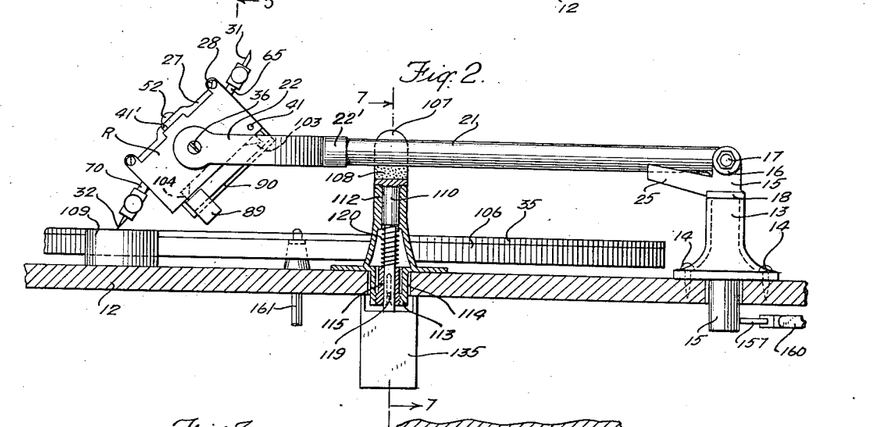
Fig. 2 represents an enlarged side view approximately along the broken line 2—2 of Fig. 1, showing the recording-reproducing unit in rest position beside the turntable.

The slidable weight 89 engages the cams 103 and 104 when it slides from one end of rod 90 to the other. Thus, when the unit R is swung into recording position as shown in Fig. 11, the weight 89 as it slides downward toward the front of the casing automatically depresses the cams 103 of switch arms 91 and 92, whereby the latter are moved into engagement with their associated contacts 96 and 97. At the same time, the spring arm 92 moves the adjacent arm 93 against its contact 98 (see Fig. 17a). When the unit R is swung into reproducing position, as shown in Fig. 2, the sliding weight 89 engages the cam projections 104 and actuates the switch arms 94 and 95, the first arm being opened and the other being closed. It is thus clear that the mere movement of unit R automatically controls certain switches which are so connected in circuit as to place the machine automatically in condition for recording and reproducing, depending upon the position of unit R. That is to say, when the recording stylus 31 is placed on a record blank, the switches operated by the sliding weight 89 so change the circuit connections of the electrical system that the latter is in condition to record the transmitted sound. On the other hand, when the phonograph needle 32 is placed on a record for reproducing, the switches controlled by the sliding weight 89 automatically place the system in condition for reproducing the recorded sound through the loudspeaker of the machine. This will be made clear in the description of Fig. 22.

When the recording and reproducing unit R is not in use, the pivoted supporting arm 21 is swung to one side of turntable 106 and placed on a support 107 which is preferably U-shaped, or at least recessed to receive the arm 21, and the bottom of the support may be covered with a non-metallic pad 108. A small cushion 109 may be placed on the motorboard 12 as a rest for the stylus members 31 and 32, and also to prevent swinging of the pivoted unit R. The support 107 is vertically movable and has a stem 110 mounted in a hollow post 112, which is secured to the top board 12 in any practical way. The base of post 112 has a downward extension 113 which passes through a hole 114 in top board 12, as best shown in Fig. 7. A short sleeve 115 is attached inside the hollow extension 113 in any practical way, as by a screwthreaded connection 116. The concentric tubular members 113 and 115 are provided with longitudinal slots 117 and 118, which are arranged in diametric alignment for receiving a cross-pin 119 carried by the stem 110 of support 107. An expanding coil spring 120 surrounds the stem 110 and bears at its lower end against the top of fixed sleeve 115. The weight of arm 121 and unit R on the movable support 107 holds the stem 110 pushed down until the cross-pin 119 is at the bottom of slots 117—118; or, the downward movement of stem 110 may be limited by the annular shoulder 122 resting on top of the hollow post 112. When the arm 21 is removed from support 107, the compressed spring 120 instantly expands and pushes the support upward until the cross-pin 119 strikes the top edges of slots 117—118. The cross-pin 119 also prevents rotation of the U-shaped support 107, so that the latter is always in position for receiving the arm 21. The function of the vertically movable stem 110 is to control certain switches, as I shall now proceed to describe.

Figures 3, 4:
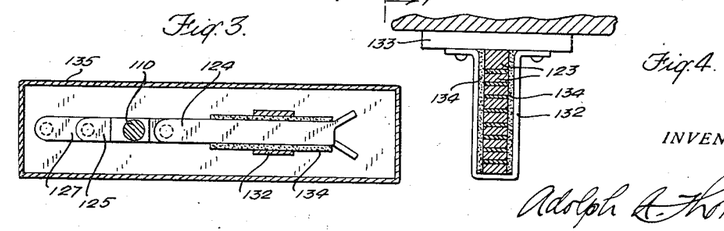
Figs. 3 and 4 are sectional views on lines 3—3 and 4—4 respectively of Fig. 7.

To the underside of the top board 12 is attached an insulating block indicated as a whole by 123. This block carries eight switch members numbered consecutively from 124 to 131. These switch members may be in the form of spring blades inserted in slots in the insulating block 123. Instead of using a single slotted block, I may build up the latter by means of separate strips interposed between the switch members, as shown in Figs. 4 and 7. A simple way to attach the switch block 123 to the motorboard 12 is by means of a U-shaped strap 132, which is fastened to a base plate 133. If the strap 132 is metal, it is lined with insulating material 134. By mounting the entire switch assembly on base plate 133, it is easily attached as a unit to the underside of motorboard 12. If desired, the switch assembly 124—131 may be enclosed in a box 135 which has an opening to receive the lower end of plunger 110.

Referring to Fig. 7, the switch members 124, 126, 128 and 131 are stationary contacts, while the other switch members are spring arms adapted to be actuated by the movable stem or plunger 110 of support 107. The normal set or tension of the movable switch arms 125, 127 and 129 is such that they normally engage the associated contacts 124, 126 and 128. On the other hand the normal tension of switch arm 130 holds it away from the adjacent contact 131. When I speak of the normal position of switch arms 125, 127, 129 and 130, I mean the position which they occupy by virtue of their inherent tension when the plunger 110 is held in raised position by spring 120. This happens when the arm 21 is off the support 107. The movable switch arms 125, 127 and 129 are provided at their free ends with insulating buttons or pins 136, 137 and 138, respectively, and these pins act as mechanical connections for simultaneously actuating all the switch arms when the plunger 110 is pushed down under the weight of arm 21 and unit R. It is clear from Fig. 7 that the downward movement of plunger 110 opens the switch arms 125, 127 and 129, and at the same time closes the switch arm 130. The circuit connections for the switch members 124—131 will be described in connection with Fig. 22.

Figure 6:
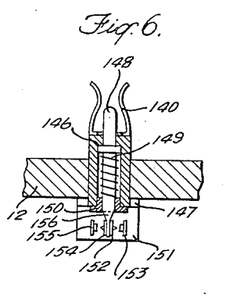
Fig. 6 is a transverse section on line 6—6 of Fig. 5, with the microphone omitted.

A hand transmitter or microphone 139 is supported in normal or rest position over the top board 12 by means of a spring clip 140 and a block 141, which is preferably provided with a recess 142 for receiving one end of the transmitter handle 143. The end knob 144 of handle 143 may be weighted to counterbalance the head of the instrument. The transmitter 139 may be electromagnetic, electrostatic, of the carbon granule type, or of any other practical construction capable of converting sound waves into electric impulses. The conductor cable 145 that connects the transmitter in circuit passes through the hollow handle 143 and is loose within the cabinet for a certain length to permit removal of the transmitter from its support for a convenient distance from the cabinet. The U-shaped spring clip 140 is mounted on top of a hollow post 146, which projects through an opening in the motorboard 12. In the present instance the hollow post 146 is cast as an integral extension of a flat plate 147, which is secured to the underside of the motorboard. A plunger 148 is movably mounted in the fixed post 146, and an expanding coil spring 149 normally pushes the plunger upward into the spring clip 140, as shown in Fig. 6. The coil spring 149 is retained in post 146 by a removable plug 150 through which the lower end of plunger 148 extends.

The plate 147 carries an insulating block 151, which supports two pairs of switch members 152—153 and 154—155. The switch members 152 and 154 are a pair of spring arms normally held by their inherent tension out of engagement with the associated contacts 153 and 155. The vertically movable plunger 148 terminates in its lower end in a bevelled extension 156 which projects between the movable switch arms 152 and 154. When the transmitter 139 is placed on the support 140, the weight of the instrument pushes the plunger 148 down, whereby the cam-shaped end 156 of the plunger separates the switch arms 152—154 and presses them against their adjacent contacts 153—155. In other words, as long as the transmitter 139 is in normal rest position on the cabinet, the two switches 152—153 and 154—155 are closed. When the transmitter is taken off its support for use in recording, the two switches 152—153 and 154—155 are automatically opened to cut out the loud-speaker and the radio input circuit, as will be more fully explained in connection with Fig. 22. In the broad aspect of my invention, the transmitter or microphone 139 may be normally supported in any convenient position on or within the cabinet of the machine, and any practical arrangement may be used for automatically closing the normally open switches 152—153 and 154—155 when the transmitter is removed from its rest position.

Figure 22:
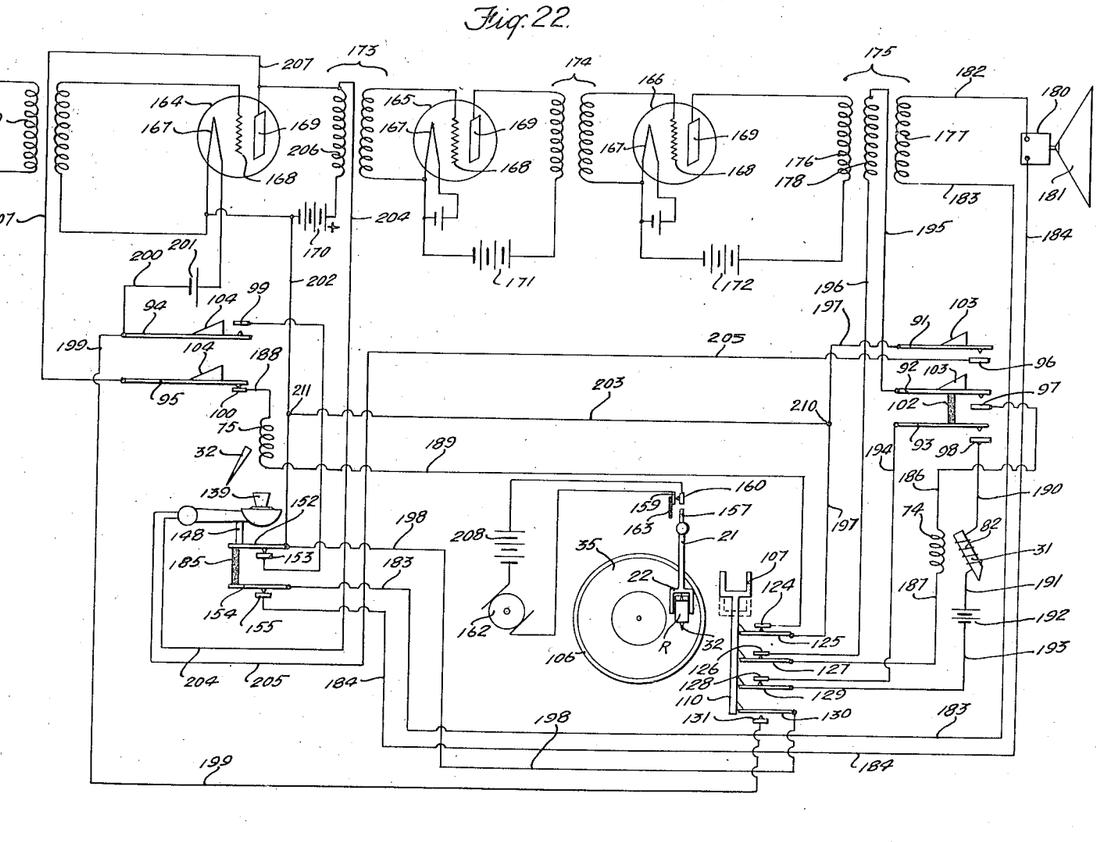
Fig. 22 is a diagram of the circuit connections automatically controlled by the position of the recording-reproducing unit and the recording microphone.

Referring to Fig. 8, it will be seen that the rotary sleeve 15, to which the swinging arm 21 is hinged, projects below the top board 12 and carries a lateral pin or extension 157. To the underside of top board 12 is attached an insulating block 158 which carries a pair of switch members 159 and 160. The switch member 159 is a movable spring arm which normally tends to engage the associated contact 160 to close the circuit of the electric motor that operates the turntable shaft 161. In Fig. 22 the turntable motor is diagrammatically represented by the outline 162. The free end of switch arm 159 (see Figs. 8 and 10) carries an insulating pad or button 163 arranged in the path of movement of cross-pin 157. When the swinging arm 21 rests on its support 107, the cross-pin 157 holds the switch arm 159 open, as shown in Fig. 10, so that the turntable motor 162 is de-energized. When the arm 21 is removed from support 107 to place the unit R in recording or reproducing position on a record 35, the cross-pin 157 disengages the switch arm 159 and the latter automatically snaps into pressure contact with the adjacent switch member 160, whereby the circuit of motor 162 is automatically closed to start the turntable 106. When the recording or reproducing operation is finished and the unit R returned to normal rest position on the support 107, the cross-pin 157 automatically opens the circuit of motor 162 and the turntable stops. This automatic starting and stopping of the turntable relieves the operator of the bother of closing a separate switch for the turntable motor.

In the circuit diagram of Fig. 22, I have shown only so much of an electronic amplifying system for radio receivers and electric phonographs as is needed for an explanation of the automatic circuit control of my invention. The three vacuum tubes 164, 165 and 166 may be considered as representing three stages of audio amplification. Each tube has the usual filament 167, grid 168 and plate 169. To simplify the diagram I have indicated separate batteries 170, 171 and 172 for the plate circuits of the tubes, but in actual practice there would be a single source of current, and this explanation also applies to the separate film batteries. The amplifying tubes are electrically connected by transformers 173 and 174, but any other practical arrangement may be used. The output transformer 175 comprises a primary or plate coil 176 and two secondary coils 177 and 178. For the purposes of this description, the primary coil 179 which is connected to the plate circuit of the preceding tube may be regarded as the radio input coil for the audio amplifying stages represented by tubes 164, 165 and 166. The secondary output coil 177 is connected to the driving unit 180 of loudspeaker diaphragm 181, which is shown in the form of a conventional cone. It is understood that any practical type of loudspeaker may be operated or controlled by coil 177. The secondary coil 178 is not necessary in all cases, for the coil 177 may also be used during the recording operation.

Figure 5:
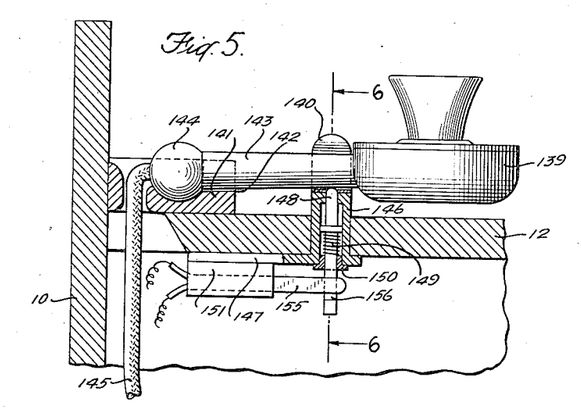
Fig. 5 illustrates an enlarged view of the recording microphone in normal rest position on the cabinet, this view being partly sectioned along the line 5—5 of Fig. 1.

One side of the loudspeaker coil 177 is connected by wire 182 to the driving unit 180, and the other side of the coil is connected by wire 183 to the movable switch arm 154, which is controlled by the position of the recording transmitter 139, as previously explained. The contact 155 associated with switch arm 154 is connected by wire 184 to the other terminal of the loudspeaker unit 180. For convenience I have shown the movable switch arms 152 and 154 in Fig. 22 connected by an insulating pin 185. This arrangement is diagrammatically the equivalent of the mechanical structure shown in Figs. 5 and 6. It is clear from what has been said that the opening of switch 154—155, when the microphone 139 is taken off its support, cuts the loudspeaker 181 out of circuit. In the broad aspect of my invention it is not necessary to actually break the circuit of coil 177 in order to render the loudspeaker inoperative. For example, the same result can be achieved by short-circuiting the driving unit 180 when the microphone 139 is lifted off its support. In that case the switch 154—155 will be open when the microphone is in normal position, and will be automatically closed when the microphone is taken up for recording. Another way to render the loudspeaker unit 180 inoperative upon removal of the transmitter 139 is to cause the switch 154—155 to include a high resistance in series with the output coil 177, so that the small amount of current flowing through the loudspeaker unit would be insufficient to operate the diaphragm 181 at loudspeaker volume. In other words, the diaphragm would produce very little, if any, sound. From these explanations it will be understood that, when I refer to cutting the loudspeaker 180—181 out of circuit during the recording operation, I mean disabling it in such a way that it can not reproduce in the usual way.

The recording coil 74 is connected by wire 186 to contact 97 and by wire 187 to the movable switch arm 127. The reproducing coil 75 is connected by wire 188 to contact 100 and by wire 189 to contact 124. The heating coil 82 of the recording stylus 31 is connected by wire 190 to contact 98 and by wire 191 to one terminal of battery 192. The other terminal of battery 192 is connected by wire 193 to the movable switch arm 129, and the associated stationary contact 128 is connected by wire 194 to switch arm 93. The secondary coil 178 is connected by wire 195 to the movable switch arm 92, and by wire 196 to the stationary contact 126. If the secondary coil 178 is omitted, as previously suggested, the wires 195 and 196 are connected to the ends of output coil 177, whereby the recording coil 74 would be shunted across coil 177 and loudspeaker unit 180. The movable switch members 91 and 125 are electrically connected by wire 197, and a wire 198 connects the movable switch arms 130 and 152. The stationary contact 131 is connected by wire 199 to the movable switch arm 94, which is also connected by wire 200 to one side of the filament battery 201 of tube 164. The negative terminal of plate battery 170 is connected by wire 202 to the movable switch arm 152. The conductors 197 and 202 are electrically connected by wire 203. The terminals of microphone 139 are connected to a pair of conductors 204 and 205, of which the latter is connected to switch contact 96. The other microphone conductor 206 is connected to one side of the primary coil 206 of transformer 173, and the same side of the coil is also connected by wire 207 to the movable switch arm 95. The source of electric power for the turntable motor 162 is indicated for convenience by a separate battery 208, although in the actual machine the motor will run from the house-lighting current, either alternating or direct. It is hardly necessary to explain that in describing the circuit connections I use the word "wire" to indicate any practical form of conductor—such as contact plates, bus bars, rods, strips, or whatever may be found convenient.

In Fig. 22 it has been assumed that the unit R is in reproducing position with the needle 32 engaging a record. Consequently, the switch arms 91, 92, 93 and 94 in casing 26 are open, while the switch arm 95 is closed. The swinging arm 21 being off its support 107, the three switch arms 125, 127 and 129 controlled by plunger 118 are closed, and the fourth switch arm 130 is open. Since the recording transmitter 139 is not in use and is presumed to rest on its support, the switch arms 152 and 154 are closed. The circuit of battery 208 is closed by the movable switch arm 159, because the cross-pin 157 of sleeve 15 is out of engagement with the switch arm, so that the turntable 106 is running. It is assumed that the machine has a main power switch and that the operator closed the switch before moving the unit R over the record.

During the reproducing operation, the circuit of output coil 177 is closed through switch 154—155 to operate the loudspeaker unit 180. At the same time, the circuit of secondary coil 178 and recording coil 74 is broken, because the switch arm 92 in unit R is open. In the particular amplifying system illustrated in Fig. 22, I utilize the plate coil 206 of tube 164 as the first amplifying stage of the electric impulses generated in coil 75 by the vibration of the phonograph needle 32. The circuit of battery 170 is completed through coils 75 and 206 in series as follows: From the positive terminal of battery 170, through coil 206, wire 207, switch arm 95, contact 100, reproducing coil 75, wire 189, closed switch 124—125, wire 197 to point 210 wire 203 to point 211, and through wire 202 back to battery 170. The impulses induced in primary coil 206 are amplified through tubes 165 and 166, and also through the output transformer 175, in the usual way, and this amplification is sufficient to cause operation of the loudspeaker at the requisite volume. It should be noted that, during the reproducing operation, the filament circuit of tube 164 is not closed on account of the open switch arm 94, so that the tube is inoperative. This means that the amplifying system (or so much of it as is used for phonographic reproduction) is electrically disconnected from the radio input coil 179, whereby no interference from broadcasting stations is possible. In other words, the radio receiver is inoperative when the machine plays as a phonograph.

Let us now suppose that we want to make a record of a person's voice through the transmitter 139. It is only necessary to take the transmitter off its support and place the unit R in recording position on a blank record. The mere movement of unit R to recording position closes the switch arms 91, 92 and 93, while at the same time the switch arm 94 is closed and the switch arm 95 is opened. The closing of switch arm 91 connects the microphone 139 in circuit with coil 206, while the opening of switch arm 95 cuts the reproducer coil 75 out of circuit. The microphone circuit may be traced as follows: From the positive terminal of battery 170, through coil 206, wire 204, through the electric mechanism of transmitter 139, wire 205, contact 96, closed switch arm 91, wire 197 to point 210, wire 203 to point 211, and through wire 202 back to battery 170. The transmitter 139 is now in series with coil 206, so that the operation of the transmitter by sound waves induces current impulses in that coil, and those impulses are amplified through tubes 165 and 166 and through the output transformer 175.

The current impulses produced in the primary coil 206 by the operation of transmitter 139 pass through the secondary output coil 178 and the recording coil 74 in amplified form sufficient to actuate the recording stylus 31. The coils 74 and 178 are connected in series as follows: Beginning with one side of coil 178, through wire 195, switch arm 92, contact 97, wire 186, recording coil 74, wire 187, closed switch 127—126, and through wire 196 to the other side of coil 178. If the heating coil 82 is used, the circuit of that coil is closed through battery 192, wire 191, coil 82, wire 190, contact 98, closed switch arm 93, wire 194, closed switch 128—129, and through wire 193 back to the battery. It should be noted that the circuit of heating coil 82 is closed only when the unit R is in recording position over the turntable 106. Although the switch arm 94 is closed during the operation of recording through the transmitter 139, the filament circuit of tube 164 is open, because the switch arm 152 is open as long as the transmitter is off its support. There is therefore no interference from radio reception when the microphone 139 is used for recording.

It frequently happens that a person would like to make a permanent record of an unusual broadcast program—such as, the speech of a world-famous statesman or author, the song of a great singer, the rendition of a symphony orchestra, or any other broadcast number that has a special appeal for the listener. The recording of radio broadcast simultaneously with its reproduction through the loudspeaker 181 is automatically accomplished by merely placing the unit R in recording position on a record blank. It is assumed that during this operation the transmitter 139 remains on its support, because it not needed. It is clear from Fig. 22 that, during the recording of a radio program, the switch arms 91, 92, 93 and 94 are closed, while the switch arm 95 is open. At the same time, the switch arms 152 and 154 remain closed, because the microphone 139 is not in use. Under these conditions the amplifying tube 164 is operative, because the circuit of filament 167 is completed through the closed switches 94—99 and 152—153. The two secondary output coils 177—178 are both operative, so that the broadcast reception is reproduced through the loudspeaker 181 and is simultaneously recorded by the operation of stylus 31. If the heating coil 82 for the recording stylus is not used, the switches 93—98 and 128—129 are not needed, thereby simplifying the apparatus.

When the unit R and the transmitter 139 are both in normal or rest position, the recording and reproducing circuits are out of commission and the machine is in condition to operate as a radio receiver only. This may be called the normal operative condition of the radio-phonograph-recording machine. Therefore, if a person wants to tune in a station, he need only turn on the main switch and manipulate the tuning knob. If the machine is to be played as a phonograph, the operator need only lift the arm 21 off the support 107 and place the unit R in reproducing position on the record. When it is desired to make a record of a person's voice in the home, the microphone 139 is lifted off its support and the unit R is placed in recording position on a blank record. The microphone is intended to be held in the hand by the person who speaks into it. For recording a radio broadcast while simultaneously receiving it through the loudspeaker, it is only necessary to place the unit R in recording position, the transmitter 139 being left undisturbed. All these various operations take place automatically by the mere movements of unit R and transmitter 139, without the need of manipulating separate hand switches. Furthermore, as previously explained, the placing of unit R in recording position automatically increases the pressure on the cutting stylus 31 by means of the sliding weight 89, so that the latter requires no attention by the operator. The automatic switch arrangements of my invention assure the proper condition of the machine for carrying out the intended operation. Since the possibility of forgetting to operate a hand switch or moving the wrong switch member is wholly eliminated, the practical result is a combined radio-phonograph-recording machine so simple to operate that even a child can use the machine for any one of its functions.

Although I have shown and described certain specific constructions, I want it understood that my invention is not limited to the details set forth. The basic features of my invention may doubtless be embodied in other forms and arrangements than above described, without departing from the scope of the appended claims. Furthermore, it is not necessary that all the novel features herein set forth shall be embodied in one machine, for it is manifestly possible to use certain features without others.

I claim as my invention:

1. In an electric phonograph, the combination of a movable support, a combined electric recording and reproducing unit pivotally mounted on said support for recording on and reproducing from disk records of the lateral-cut type, said pivotal mounting of the unit on its support comprising a substantially horizontal pivot axis about which the unit is swung into either of two operative positions, said unit being supported in one position for recording and in another position for reproducing.

2. In an electric phonograph having a turntable for supporting a record disk, the combination of an arm mounted to swing over a disk on the turntable, a casing supported on said arm, a recording stylus and a reproducing stylus carried by said casing, means utilizing electric impulses for operating said recording stylus, means for generating electric impulses by the movements of said reproducing stylus, and means for bringing either stylus into operative engagement with a disk on the turntable, said last mentioned means including a substantially horizontal pivot axis about which said casing is turned to either one of its two operative positions.

3. An electric phonograph having a movable support, a combined recording and reproducing unit mounted on said support, said unit comprising a recording stylus, a reproducing stylus, and electromagnetic mechanism adapted to receive current impulses for operating said recording stylus and adapted to generate current impulses by the vibrations of said reproducing stylus, and means whereby either stylus is movable into operative engagement with a record, said means including a substantially horizontal pivot axis about which the unit is swung into either recording or reproducing position.

4. In an electric phonograph, the combination of an arm mounted to swing horizontally over a record disk, a casing connected to said arm, combined electric recording and reproducing mechanism carried by said casing, said mechanism including a recording stylus and a reproducing stylus, and means whereby said casing is adjustable to bring either stylus into operative engagement with a record disk, said means including a substantially horizontal pivot axis about which the casing is swung into recording or reproducing position as desired.

5. An electric phonograph having a support movable in operative relation to a record, a combined recording and reproducing unit mounted on said support and carrying adjustable means for increasing the effective weight of the unit during the recording operation, said adjustable weight means being mounted on said unit independently of said support.

6. The combination of a casing carrying recording means and reproducing means, a support on which said casing is adjustably mounted to bring either of said means into operative position, and a weight adjustably mounted on said casing independently of said support to increase the pressure of said recording means on a record.

7. In an electric phonograph, the combination of a movable support, a casing mounted on said support, combined electric recording and reproducing mechanism carried by said casing, said mechanism including a recording stylus and a reproducing stylus, means whereby said casing is adjustable to bring either stylus into operative position, said casing being held at an angle in either position, and a weight slidably mounted on said casing and arranged to move by gravity to a position of increased pressure when the recording stylus engages a record.

8. In phonographic apparatus, the combination of a movable support, a casing carried by said support and provided with a pair of independently operable stylus members, one of said members being adapted to record on a disk and the other member being adapted to reproduce from the recorded disk, electromagnetic mechanism in said casing, said mechanism including a pair of coils, one coil being adapted to receive electric impulses for operating said recording member, the other coil being adapted to generate electric impulses by the movements of said reproducing member, means whereby said casing is adjustable to bring either stylus member into operative position, and means for connecting only one of said coils in circuit at one time, depending upon which stylus member is in operative position.

9. In an electric phonograph, the combination of a movable support, a casing carried by said support, combined electric recording and reproducing mechanism carried by said casing, said mechanism including a recording stylus and a reproducing stylus, means whereby said casing is adjustable to bring either stylus into operative position, an electric heating element for said recording stylus, and switch means automatically controlled by the position of said casing for closing the circuit of said heating element during the recording operation.

10. In an electric phonograph, the combination of a combined electric recording and reproducing unit having a recording stylus and a reproducing stylus, means whereby said unit is adjustable to recording or reproducing position, and electric heating means automatically energized when said unit is in recording position to heat the recording stylus, said heating means being inoperative during the reproducing operation of said unit.

11. In a phonographic recording and reproducing machine, the combination of a support movable in operative relation to a record, a combined recording and reproducing unit adjustably mounted on said support, said unit comprising a casing adapted to be supported in one position for recording and in another position for reproducing, a member adjustably mounted on said casing, and switch means in said casing automatically controlled by the position of said member on said casing.

12. In a phonographic recording and reproducing machine, the combination of a support movable in operative relation to a record, a combined recording and reproducing device carried by said support and adjustable thereon to two operative positions, one for recording and the other for reproducing, a member adjustably mounted on said device, switch means operated by said member when the device is in recording position, and other switch means operated by said member when the device is in reproducing position.

13. In phonographic recording and reproducing apparatus, the combination of an electric amplifying system, electric recording means and electric reproducing means adapted to be connected to said system, each of said means comprising a coil and a stylus, means whereby either coil and a stylus is adjustable into and out of operative relation to a phonograph record, and switch mechanism automatically controlled by the adjustment of said recording and reproducing means for placing said amplifying system in condition for recording and reproducing, depending upon which of said means is in operative position, said switch mechanism including means for automatically disconnecting either of said coils when the other coil is connected in circuit.

14. The combination of a radio receiver and an electric phonograph housed in a single cabinet, an electric amplifying system and a loudspeaker common to said receiver and phonograph, recording apparatus utilizing at least a portion of said amplifying system and including a movable telephone transmitter, means for normally supporting said transmitter in a certain position in said cabinet, and switch connections automatically operated by the movement of said transmitter out of normal position to disconnect the radio input circuit from said amplifying system and to render the loudspeaker substantially inoperative during the recording operation.

15. In a combined radio receiver and phonograph, the combination of an electric amplifying system having portions common to said receiver and phonograph, a movable telephone transmitter adapted to be connected to said system, means for holding said transmitter in normal inoperative position, a radio input circuit normally connected to said amplifying system, switch mechanism automatically operated by the movement of said transmitter out of normal position to disconnect said radio input circuit, recording means controlled by said transmitter, and reproducing means operative only when said transmitter is in normal position, said recording and reproducing means utilizing said amplifying system.

16. Phonographic recording and reproducing apparatus comprising an electric amplifying system, a recording stylus operable by means of amplified electric impulses coming from said system, a reproducing stylus adapted to generate electric impulses amplified by said system, a casing for supporting both of said styli, an arm on which said casing is adjustably supported, said arm being adapted to occupy a normal rest position, whereby either stylus may be placed in operative relation to a record, a pivotal support for said arm to permit swinging of the latter toward and away from a playing record, and switch mechanism conjointly controlled by the movement of said arm from rest position and by the position of said casing on the arm for placing said amplifying system in condition for recording when the recording stylus is operative, and for placing said system in condition for reproducing when the reproducing stylus is operative.

17. In phonographic recording and reproducing apparatus, the combination of an electric amplifying system, a combined recording and reproducing device adapted to occupy one position for recording and another position for reproducing, a movable telephone transmitter adapted to be connected to said system, means for holding said transmitter in normal inoperative position, and switch mechanism controlled by the positions of said transmitter and device for automatically placing said system in condition for recording when said device is moved to recording position and when said transmitter is moved out of normal position, said switch mechanism automatically placing said system in condition for reproducing when the transmitter is in normal position and when said device is in reproducing position.

18. In a combined radio receiver and electric phonograph, the combination of an electric amplifying system having portions common to said receiver and phonograph, electric recording means and electric reproducing means both utilizing said amplifying system, each of said means being adjustable into and out of operation relative to a phonograph record, switch means automatically controlled by the mere adjustment of said recording and reproducing means into operative position for changing said system into condition for recording and reproducing, a movable telephone transmitter normally in rest position, and normally closed switch means for connecting the radio input circuit and said loudspeaker to said amplifying system, said switch means being automatically opened when the transmitter is removed from its rest position for use in recording.

19. A combined recording and reproducing unit comprising a field magnet system, a pair of vibratory armatures operatively associated with said system which is common to both armatures, a recording stylus connected to one armature and a reproducing stylus connected to the other armature, a coil associated with the recording armature to actuate the same in accordance with current impulses passing through the coil, and a second coil associated with the reproducing armature to generate current impulses in accordance with the vibrations of the reproducing stylus.

20. The combination of a radio receiver and an electric phonograph, an electric amplifying system common to said receiver and phonograph, recording apparatus utilizing at least a portion of said amplifying system and including a movable telephone transmitter, means for normally supporting said transmitter in a certain position, and switch connections automatically operated by the movement of said transmitter out of normal position to disconnect the radio input circuit from said amplifying system and to connect the transmitter to said system.

21. In phonographic apparatus, the combination of a movable support, a casing adjustably mounted on said support, a combined recording and reproducing unit carried by said casing, which is adjustable on said support either into recording or into reproducing position, said unit including a recording stylus and a reproducing stylus, and means automatically controlled by the adjustment of said casing on its support into recording position for causing a greater pressure to be exerted on the recording stylus than the pressure exerted on the reproducing stylus.

22. In phonographic apparatus, the combination of a movable support, a casing adjustably mounted on said support, a combined recording and reproducing unit carried by said casing, which is adjustable on said support either into recording or into reproducing position, and a weight adjustably mounted on said casing for increasing the pressure on said unit during the recording operation over the pressure during the reproducing operation.

23. In phonographic apparatus, the combination of a movable support, a casing mounted on said support and adjustable thereon into either of two operative positions, combined recording and reproducing means carried by said casing, said means including a recording stylus and a reproducing stylus so arranged that only one of them can be in operative position at one time, and a weight movably mounted on said casing and arranged to occupy two positions thereon, the pressure of said weight on the recording stylus being greater than its pressure on the reproducing stylus.

24. In phonographic apparatus, the combination of a movable support, a casing mounted on said support and adjustable thereon into either of two operative positions, combined recording and reproducing means carried by said casing, said means including a recording stylus and a reproducing stylus so arranged that only one of them can be in operative position at one time, a weight slidably mounted on said casing and arranged to occupy two positions thereon, the pressure of said weight on the recording stylus being greater than its pressure on the reproducing stylus, and switch means carried by said casing and controlled by the two positions of said weight on the casing.

25. In phonographic apparatus, the combination of a movable support, a casing carried by said support and provided with a pair of independently operable stylus members, one of said members being adapted to record on a blank disk and the other member being adapted to reproduce from a recorded disk, electric mechanism in said casing adapted to receive electric impulses for operating said recording member, said mechanism being also adapted to generate electric impulses by the movements of said reproducing member, means whereby said casing is adjustable to bring either stylus member into operative position, and a weight adjustably mounted on said casing for increasing the pressure on the recording stylus over that on the reproducing stylus.

26. In phonographic apparatus, the combination of a movable support, a casing carried by said support and provided with a pair of independently movable stylus members, one of said members being adapted to record on a disk and the other member being adapted to reproduce from the recorded disk, electric mechanism in said casing adapted to receive electric impulses for operating said recording member, said mechanism being also adapted to generate electric impulses by the movements of said reproducing member, means whereby said casing is adjustable on its support to bring either stylus member into operative position, and a weight slidably mounted on said casing in such position that the mere adjustment of the casing to recording position automatically moves said weight to a position whereby the pressure on the recording stylus is increased.

27. A combined reproducer and recorder comprising an amplifier, a speaker, a microphone, and a pick-up having windings adapted to be substituted for said microphone for reproduction and having windings adapted to be substituted for said speaker for recording.

28. A combined reproducer and recorder comprising an amplifier, a speaker, a microphone, and a pick-up having windings adapted to be substituted for said microphone for reproduction, and having windings adapted to be substituted for said speaker for recording, and selective switching devices for effecting said substitution.

29. A combined recording and reproducing unit having two electro-magnetic coils, one of which is used for recording and the other for reproducing, and a field magnet structure common to both coils.

ADOLPH A. THOMAS.